P. HOGG.
Injector for Heating Liquids.
No. 43,691. Patented Aug. 2, 1864.
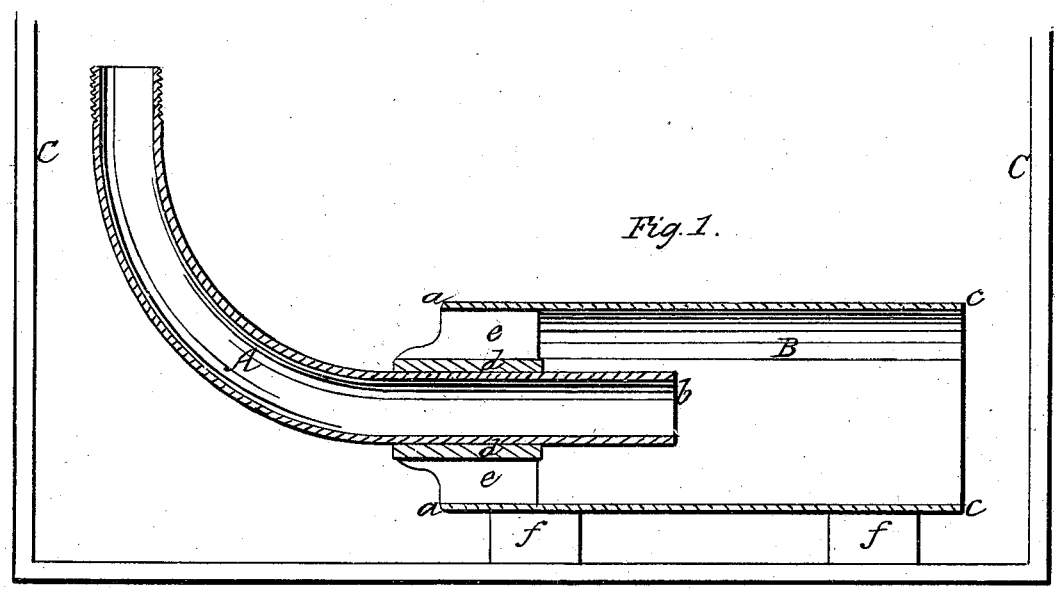
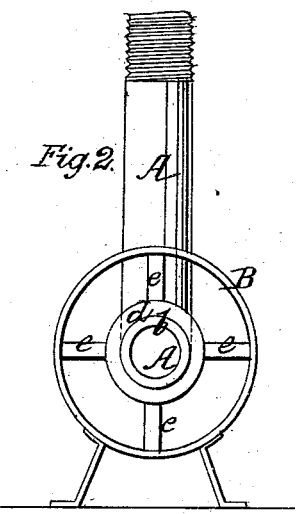
Witnesses.
Geo. W. Reed
Jas. P. Hall.
Inventor.
Peter Hogg.

UNITED STATES PATENT OFFICE.

PETER HOGG, OF BROOKLYN, E. D., NEW YORK.

IMPROVED INJECTOR FOR HEATING LIQUIDS.

Specification forming part of Letters Patent No. 43,691, dated August 2, 1864.

*To all whom it may concern:*

Be it known that I, PETER HOGG, of Brooklyn, E. D., in the county of Kings and State of New York, have invented a new and useful improvement in apparatus for boiling or heating water and other liquids by the injection of steam thereinto; and I do hereby declare that the following is a full, clear, and exact description thereof, which will enable those skilled in the art to make and use the same, reference being had to the accompanying drawings, forming a part of this specification, in which—

Figure 1 is a central longitudinal vertical sectional view of my invention. Fig. 2 is an end view of the same.

Similar letters of reference indicate like parts.

The boiling and heating of water and other liquids by the injection of steam thereinto is very commonly practiced in sugar-houses and other manufacturing establishments. The common mode of effecting this is simply to insert the end of the steam-pipe into the lower part of the tank, vat, or other vessel in which the boiling or heating is to be effected, and the steam in its issue from the pipe creates such a commotion in the liquid as not only to make a very objectionable noise, but even when the operation is on a large scale to shake the building in which the process is performed.

The object of my invention is to prevent this commotion of the liquid, and to this end consists in surrounding the mouth of the steam-pipe with a larger open tube, through which the issue of steam is caused to produce a rapid but easy circulation of the liquid.

A is the steam-pipe entering the tank C from above, and curved to bring its terminal portion in a horizontal position near the bottom of the tank and below the surface of the liquid contained therein. B is the tube which surrounds the horizontal terminal portion of the steam-pipe, arranged horizontally and concentric with the said portion of the pipe. This tube is open at both ends, one end, $a$, extending back some distance from and the other, $c$, extending forward some distance beyond the mouth $b$ of the steam-pipe. The said tube is furnished at its rear end, $a$, with a central socket, $d$, which is attached to it by means of arms $e\ e$, and which fits tightly to the horizontal portion of the tube, and it is also furnished with feet $ff$ to support it upon, and some distance above the bottom of the tank, so as to permit a free circulation of liquid below it, making it at the same time serve as a support for the lower portion of the steam-pipe.

The steam issuing from the mouth $b$ of the steam-pipe within the tube B and among the water contained therein tends to expel the water therefrom through the end $c$, and the place of this water is supplied by water entering the said tube at the end $a$, thereby producing a rapid but easy and quiet circulation of water through the said tube without violent commotion.

The tube B, instead of being open at the end $a$, at which the pipe enters, may be closed at that end and one or more inlet-openings be provided in the top, bottom, or sides of the said tube, and the same effect will be obtained.

I claim as my invention and desire to secure by Letters Patent—

The employment, in an apparatus for boiling or heating liquids by the injection of steam thereinto, of a larger open tube, B, surrounding the terminal portion of the steam-pipe, substantially as and for the purpose herein specified.

PETER HOGG.

Witnesses:
J. P. HALL,
G. W. REED.